United States Patent Office 2,717,268
Patented Sept. 6, 1955

2,717,268
PROCESS FOR PREPARING PHENYLDICHLORO-ACETAMIDOPROPANEDIOLS

Mildred C. Rebstock, Detroit, and Elizabeth L. Pfeiffer, Ypsilanti, Mich., assignors to Parke, Davis & Company, Detroit, Mich., a corporation of Michigan No Drawing. Application December 16, 1952, Serial No. 326,344

8 Claims. (Cl. 260—562)

The application is a continuation-in part of our co-pending application Serial No. 301,605, filed July 29, 1952, now abandoned, and the invention relates to a process for the preparation of acylamido diol compounds. More particularly, this invention relates to a process for the production of 1-phenyl-2-dichloro-acetamidopropane-1,3-diol compounds having the formula,

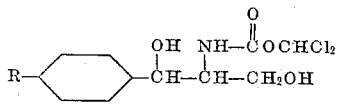

where R is a hydrogen, nitro, phenyl, —S—CH$_3$, —SOCH$_3$ or SO$_2$CH$_3$ substituent.

The above compounds as well as the starting materials used in their preparation can exist in structural or diastereoisomeric as well as optical isomeric forms. The diastereoisomeric forms are herein referred to as the threo (pseudo) and the erythro (regular) forms, respectively. Each of these diastereoisomers can exist as racemates of optically active isomers thus giving a total of six different forms. Because of the difficulty of representing these different forms in graphic formulae, the customary structural formulae will be used in the specification and the claims and a notation placed below or to the side of the formula to designate the particular structural and optical configuration of the compound. When the formula represents the unresolved mixture of structural and optical isomers the notation "unresolved" will be used. However, it should be expressly understood that where no notation appears with a structural formula, the formula is to be interpreted in its generic sense, that is, as representing the D-threo, L-threo, D-erythro or L-erythro isomers in separated form as well as DL-threo or DL-erythro optical racemates or the total unresolved mixture of structural and optical isomers. Such a formula does not merely represent the unresolved mixture of isomers.

In accordance with the invention, 1-phenyl-2-dichloro-acetamidopropane-1,3-diol compounds having the above formula are produced by reacting a compound of formula,

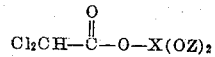

with an amino diol compound of formula,

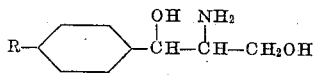

where X is a trivalent phosphorus or arsenic atom, Z is an alkyl or aralkyl radical and R is a hydrogen, nitro, phenyl, —SCH$_3$, —SOCH$_3$, or —SO$_2$CH$_3$ substituent. The process may be diagrammatically illustrated as follows:

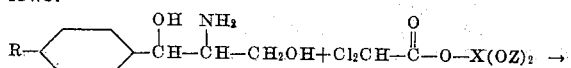
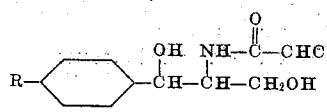

where X, Z and R have the same significance as given above.

In carrying out the process of the invention temperatures between 20 and 110° C. can be used. However, since the reaction proceeds very slowly at low temperatures, that is, about 25° C., and also because some decomposition of the relatively unstable phosphorus or arsenic reactant occurs at higher temperatures, it is preferable to carry out the reaction at a temperature in the neighborhood of 60 to 85° C. The time required for the reaction is not critical and, of course, varies with the temperatures employed. In general, the reaction is complete within one-half to three hours when a temperature of 60 to 85° C. is used.

As a solvent for the reaction it is preferable to employ an anhydrous organic solvent such as a lower aliphatic alcohol, lower aliphatic ketone, lower aliphatic ester, lower aliphatic amide or cyclic ether or a mixture of two or more such solvents. Some specific examples of these solvents are methanol, ethanol, isopropanol, acetone, methyl ethyl ketone, ethyl acetate, dimethyl formamide, dimethyl acetamide and dioxane. The relative quantities of the two reactants are not particularly critical, but for reasons of economy and highest yields it is best to use a slight excess of phosphite or arsenite compound. The addition of one equivalent of a mild alkali such as sodium bicarbonate, sodium acetate, calcium carbonate, pyridine, triisoamylamine, triethylamine and dimethylaniline to the reaction mixture also exerts a beneficial effect upon the yield of the product.

The phosphite and arsenite compounds used as starting materials can be prepared by the reaction of dichloroacetic acid with a dialkylchlorophosphite or dialkylchloroarsenite in the presence or absence of an alkaline substance such as sodium acetate, sodium bicarbonate, triethylamine, triisoamylamine, pyridine, dimethylaniline and the like. The phosphite arsenite compound,

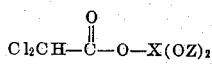

can be either isolated from the reaction mixture or it can be used in situ in the process of the invention. Due to the relative instability of these compounds and from the standpoint of economy of operation it is preferable to prepare and utilize these products in situ. As solvents in the reaction for the preparation of these starting materials, all of the aforementioned solvents for the process of the invention can be used and, in addition, where the

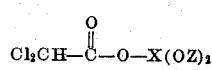

product is to be isolated before use, diethyl ether, diisopropyl ether and the like can also be employed as solvents.

The products produced by the process of the invention are useful as therapeutic agents per se or as intermediates for the production of other organic compounds possessing valuable therapeutic properties.

The invention is illustrated by the following examples.

Example 1

60 g. of dichloroacetic acid is added to 47.2 g. of triethylamine in 100 cc. of dry ether keeping the temperature at 30° C. The mixture is cooled to 0° C. and 73.4 g. of diethylchlorophosphite added dropwise, keeping the temperature below 20° C. The reaction mixture is again cooled to 0° C. and the triethylamine hydrochloride removed by filtration. The ether is distilled from the filtrate to obtain the desired diethyldichloroacetylphosphite in practically pure form. If desired, this product can be purified further by distillation (B. P. 140–143° C./1 mm. of Hg), but for most purposes this is not necessary.

3.5 g. of diethyldichloroacetylphosphite is added to 3 g. of D-(—)-threo-1-p-nitrophenyl-2-aminopropane-1,3-diol in 25 cc. of ethyl acetate and the resulting mixture heated under reflux for two and one-half hours. The reaction mixture is diluted to 300 cc. with ethyl acetate and extracted with 100 cc. of 1 N sulfuric acid. The organic layer is extracted with 50 cc. of saturated sodium bicarbonate solution, dried over anhydrous magnesium sulfate and the ethyl acetate distilled in vacuo. The residue is dissolved in hot chloroform, the solution cooled and the crystalline D-(—)-threo-1-p-nitrophenyl-2-dichloroacetamidopropane-1,3-diol collected; M. P. 151° C.; $(\alpha)_D^{25}=-25.5°$ in ethyl acetate.

*Example 2*

1.24 g. of diethyldichloroacetylphosphite is added to 1.06 g. of DL-threo-1-p-nitrophenyl-2-aminopropane-1,3-diol in 18 cc. of ethyl acetate, the resulting mixture heated for three hours on a steam bath and then diluted to a volume of 300 cc. with ethyl acetate. The reaction mixture is extracted first with 100 cc. of 1 N sulfuric acid and then with 50 cc. of saturated sodium bicarbonate solution. The organic layer is dried over anhydrous magnesium sulfate and the ethyl acetate distilled in vacuo. The residue is dissolved in 25 cc. of hot chloroform, the solution cooled and the crystalline DL-threo-1-p-nitrophenyl-2-dichloroacetamidopropane - 1,3 - diol collected; M. P. 150–1° C.

*Example 3*

2.2 g. of diethylchlorophosphite is added to 1.8 g. of dichloroacetic acid dissolved in 25 cc. of dry methanol and the solution refluxed for one hour, 1.04 g. of sodium bicarbonate and 3 g. of D-(—)-threo-1-p-nitrophenyl-2-aminopropane-1,3-diol are added to the solution containing the diethyldichloroacetylphosphite and the reaction mixture refluxed for three hours. The solution is diluted to 300 cc. with ethyl acetate and washed first with 100 cc. of 1 N sulfuric acid and then with 25 cc. of saturated sodium bicarbonate solution. The ethyl acetate solution is dried over anhydrous magnesium sulfate and the ethyl acetate removed by distillation in vacuo. The residue is dissolved in hot chloroform, the solution cooled to 0° C. and the crystalline D-(—)-threo-1-p-nitrophenyl-2-dichloroacetamidopropane-1,3-diol collected; M. P. 151° C.; $(\alpha)_D^{25}=-25.5°$ in ethyl acetate.

*Example 4*

2.2 g. of diethylchlorophosphite is added to 1.8 g. of dichloroacetic acid in 25 cc. of absolute ethanol and the reaction mixture refluxed for one hour. 1.02 g. of anhydrous sodium acetate and 3 g. of D-(—)-erythro-1-p-nitrophenyl-2-aminopropane-1,3-diol are added and the mixture heated under reflux for three hours. The reaction mixture is diluted to a volume of 300 cc. with ethyl acetate and then washed first with 100 cc. of 1 N sulfuric acid and then with 50 cc. of saturated sodium bicarbonate solution. The organic layer is dried over anhydrous magnesium sulfate, the ethyl acetate distilled and the residue recrystallized from chloroform to obtain the desired D-(—)-erythro-1-p-nitrophenyl-2-dichloroacetamidopropane-1,3-diol; M. P. 175–6° C.; $(\alpha)_D^{25}=-11.8°$ in ethanol.

*Example 5*

3 g. of diethylchloroarsenite is added to 1.8 g. of dichloroacetic acid dissolved in 25 cc. of absolute methanol and the solution refluxed for one hour. 1.02 g. of anhydrous sodium acetate and 3.0 g. of D-(—)-threo-1-p-nitrophenyl-2-aminopropane-1,3-diol are added and the mixture refluxed for three hours. The reaction mixture is diluted to 300 cc. with ethyl acetate and extracted with 100 cc. of 1 N sulfuric acid. The white precipitate is removed from the organic layer and the filtrate extracted with 50 cc. of saturated sodium bicarbonate solution. The solvents are distilled and the residual D-(—)-threo-1-p-nitrophenyl-2-dichloroacetamidopropane-1,3-diol purified by recrystallization from chloroform; M. P. 151° C.; $(\alpha)_D^{25}=-25.5°$ in ethyl acetate.

*Example 6*

2.2 g. of diethylchlorophosphite is added to 1.8 g. of dichloroacetic acid in 25 cc. of absolute ethanol and the resulting mixture heated under reflux for one hour. 3.2 g. of triisoamylamine and 2.4 g. of D-(—)-threo-1-phenyl-2-aminopropane-1,3-diol are added and the mixture refluxed for an additional three hours. The solutions is diluted to 300 cc. with ethyl acetate and washed first with 100 cc. of 1 N sulfuric acid and then with 50 cc. of saturated sodium bicarbonate solution. The organic layer is dried over anhydrous magnesium sulfate and the solvents distilled. The residue is taken up in and crystallized from ethyl acetate to obtain the desired D-(—)-threo-1-phenyl-2-dichloroacetamidopropane - 1,3 - diol; M. P. 90° C.; $(\alpha)_D^{25}=-18.6°$ in water.

*Example 7*

3.5 g. diethyldichloroacetylphosphite is added to 3.6 g. of DL-threo-1-p-biphenyl-2-aminopropane-1,3-diol dissolved in ethyl acetate and the mixture heated under reflux for three hours. The solution is diluted to 300 cc. with ethyl acetate and the solution extracted first with 100 cc. of 1 N sulfuric acid and then with 50 cc. of saturated sodium bicarbonate solution. The organic layer is dried, the ethyl acetate distilled and the residual DL-threo-1-p-biphenyl-2-dichloroacetamidopropane - 1,3-diol purified by crystallization from chloroform; M. P. 149–50° C.

*Example 8*

2.2 g. of diethylchlorophosphite is added to 1.8 g. of dichloroacetic acid in 25 cc. of absolute ethanol and the reaction mixture refluxed for one hour. 1.02 g. of anhydrous sodium acetate and 3.1 g. of DL-threo-1-p-methylmercaptophenyl-2-aminopropane-1,3-diol are added and the mixture heated under reflux for three hours. The reaction mixture is diluted to a volume of 300 cc. with ethyl acetate and then washed first with 100 cc. of 1 N sulfuric acid and then with 50 cc. of saturated sodium bicarbonate solution. The organic layer is dried over anhydrous magnesium sulfate, the ethyl acetate distilled and the residue recrystallized from chloroform to obtain the desired DL-threo-1-p-methylmercaptophenyl-2-dichloroacetamidopropane-1,3-diol; M. P. 101° C.

*Example 9*

2.2 g. of diethylchlorophosphite is added to 1.8 g. of dichloroacetic acid in 25 cc. of absolute ethanol and the resulting mixture heated under reflux for one hour. 3.2 g. of triisoamylamine and 3.1 g. of D-(—)-threo-1-p-methylmercaptophenyl-2-aminopropane-1,3-diol are added and the mixture refluxed for an additional three hours. The solution is diluted to 300 cc. with ethyl acetate and washed first with 100 cc. of 1 N sulfuric acid and then with 50 cc. of saturated sodium bicarbonate solution. The organic layer is dried over anhydrous magnesium sulfate and the solvents distilled. The residue is taken up in and crystallized from ethyl acetate to obtain the desired D-(+)-threo - 1-p - methylmercaptophenyl - 2-dichloroacetamidopropane - 1,3 - diol; M. P. 110–12°; $\alpha_D^{27}=+9.8°$ in ethanol.

*Example 10*

3.5 g. diethyldichloroacetylphosphite is added to 3.6 g. of DL-threo-1-p-methylsulfonylphenyl - 2-aminopropane-1,3-diol dissolved in ethyl acetate and the mixture heated under reflux for three hours. The solution is diluted to 300 cc. with ethyl acetate and the solution extracted first with 100 cc. of 1 N sulfuric acid and then with 50 cc. of saturated sodium bicarbonate solution. The organic layer is dried, the ethyl acetate distilled and the residual DL-threo - 1-p-methylsulfonylphenyl-2-dichloroacetamidopropane-1,3-diol purified by crystallization from chloroform; M. P. 180–182°.

Example 11

3.5 g. of diethyldichloroacetylphosphite is added to 3.6 g. of D-(—)-threo-1-p-methylsulfonylphenyl-2-aminopropane-1,3-diol dissolved in ethyl acetate and the mixture refluxed for 2.5 hrs. The solution is diluted to 300 ml. with ethyl acetate and the solution extracted first with 100 ml. of 1 N sulfuric acid and then with 50 ml. of saturated sodium bicarbonate solution. The organic layer is dried, the ethyl acetate distilled and the residual D-(+)-threo - 1-p-methylsulfonylphenyl - 2-dichloroacetamidopropane-1,3-diol purified by crystallization from chloroform; M. P. 165–6°; $(\alpha)_D^{25}=+15.6°$ in ethanol.

Example 12

1.24 g. of diethyldichloroacetylphosphite is added to 1.15 g. of DL-threo-1-p-methylsulfinylphenyl-2-aminopropane-1,3-diol in 18 cc. of ethyl acetate, the resulting mixture heated for three hours on a steam bath and then diluted to a volume of 300 cc. with ethyl acetate. The reaction mixture is extracted first with 100 cc. of 1 N sulfuric acid and then with 50 cc. of saturated sodium bicarbonate solution. The organic layer is dried over anhydrous magnesium sulfate and the ethyl acetate distilled in vacuo. The residue is dissolved in 25 cc. of hot chloroform, the solution cooled and the crystalline DL-threo-1-p-methylsulfinylphenyl - 2-dichloroacetamidopropane-1,3-diol collected.

What we claim is:

1. Process for the production of a 1-phenyl-2-dichloroacetamidopropane-1,3-diol compound of formula,

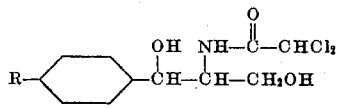

which comprises reacting a compound of formula,

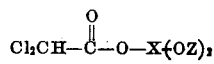

with an amino diol compound of formula,

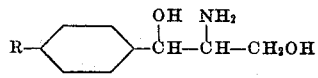

at a temperature between 20 and 110° C.; where X is a member of the class consisting of trivalent phosphorus and arsenic atoms, Z is alkyl and R is a substituent of the class consisting of hydrogen, nitro, phenyl, —S—CH₃, SOCH₃, and —SO₂CH₃.

2. Process for the production of a 1-phenyl-2-dichloroacetamidopropane-1,3-diol compound of formula,

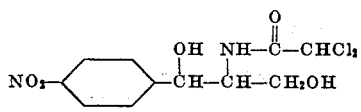

which comprises reacting a compound of formula,

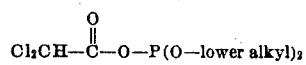

with an amino diol compound of formula,

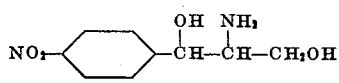

in an anhydrous organic solvent at a temperature between 20 and 110° C.

3. Process for the production of a 1-phenyl-2-dichloroacetamidopropane-1,3-diol compound of formula,

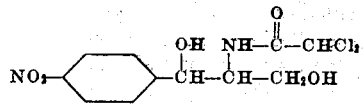

which comprises reacting diethyldichloroacetylphosphite with an amino diol compound of formula,

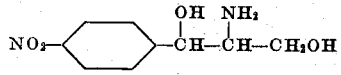

in an anhydrous organic solvent at a temperature between 60 and 85° C.

4. Process for the production of a 1-phenyl-2-dichloroacetamidopropane-1,3-diol compound of formula,

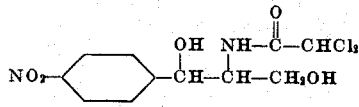

which comprises reacting diethyldichloroacetylarsenite with an amino diol compound of formula,

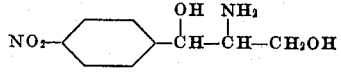

in an anhydrous organic solvent at a temperature between 60 and 85° C.

5. Process for the production of a 1-phenyl-2-dichloroacetamidopropane-1,3-diol compound of formula,

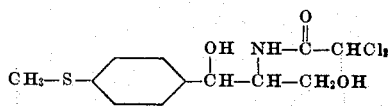

which comprises reacting a dialkyldichloroacetylphosphite with an amino diol compound of formula,

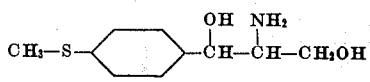

in an anhydrous organic solvent at a temperature between 20 and 110° C.

6. Process for the production of a 1-phenyl-2-dichloroacetamidopropane-1,3-diol compound of formula,

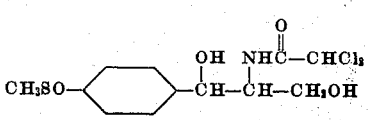

which comprises reacting a dialkyldichloroacetylphosphite with an amino diol compound of formula,

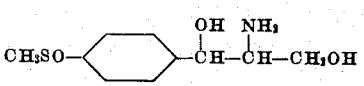

in an anhydrous organic solvent at a temperature between 20 and 110° C.

7. Process for the production of a 1-phenyl-2-dichloroacetamidopropane-1,3-diol of formula,

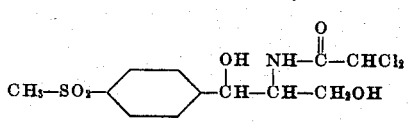

which comprises reacting a dialkyldichloroacetylphosphite with an amino diol compound of formula,

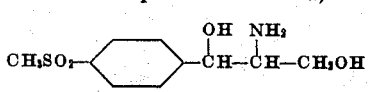

in an anhydrous organic solvent at a temperature between 20 and 110° C.

8. Process for the production of D-(+)-threo-1-p-methylsulfonylphenyl - 2 - dichloroacetamidopropane-1,3-diol which comprises reacting diethyldichloroacetylphosphite with D-(—)-threo-1-p-methylsulfonylphenyl-2-aminopropane-1,3-diol in an anhydrous organic solvent at a temperature between 60 and 85° C.

References Cited in the file of this patent

UNITED STATES PATENTS

| | | |
|---|---|---|
| 2,483,884 | Crooks et al. | Oct. 4, 1949 |
| 2,617,793 | Young | Nov. 11, 1952 |
| 2,617,796 | Vaughan | Nov. 11, 1952 |